(12) United States Patent
Wong

(10) Patent No.: US 9,779,180 B2
(45) Date of Patent: Oct. 3, 2017

(54) DETECTION OF THE N-QUERIES VIA UNIT TEST

(71) Applicant: Joseph Wong, Vancouver (CA)

(72) Inventor: Joseph Wong, Vancouver (CA)

(73) Assignee: SuccessFactors, Inc., South San Francisco, CA (US)

( * ) Notice: Subject to any disclaimer, the term of this patent is extended or adjusted under 35 U.S.C. 154(b) by 269 days.

(21) Appl. No.: 14/524,776

(22) Filed: Oct. 27, 2014

(65) Prior Publication Data
US 2016/0117417 A1    Apr. 28, 2016

(51) Int. Cl.
*G06F 17/30*    (2006.01)

(52) U.S. Cl.
CPC .............................. *G06F 17/30979* (2013.01)

(58) Field of Classification Search
CPC ......... G06F 17/30424; G06F 17/30964; G06F 17/3056; G06F 9/5027; G06F 2209/5021; G06F 17/30466; G06F 17/30436; G06F 17/30979; G06F 11/263; G06F 11/36; G06F 17/30595; G06F 17/30082; G06F 17/30; G06F 17/30646; G06F 17/30864
See application file for complete search history.

(56) References Cited

U.S. PATENT DOCUMENTS

| 6,263,328 | B1* | 7/2001 | Coden | G06F 17/30398 |
| 6,285,997 | B1* | 9/2001 | Carey | G06F 17/30457 |
| | | | | 707/E17.014 |
| 6,421,656 | B1* | 7/2002 | Cheng | G06F 17/30595 |
| | | | | 707/E17.005 |
| 6,460,043 | B1* | 10/2002 | Tabbara | G06F 17/30392 |
| | | | | 707/E17.109 |
| 6,754,652 | B2* | 6/2004 | Bestgen | G06F 17/30463 |
| | | | | 707/E17.104 |
| 8,332,388 | B2* | 12/2012 | Chaudhuri | G06F 17/30463 |
| | | | | 707/718 |
| 2001/0047372 | A1* | 11/2001 | Gorelik | G06F 17/30604 |
| | | | | 707/E17.124 |
| 2003/0187831 | A1* | 10/2003 | Bestgen | G06F 17/30463 |
| | | | | 707/E17.012 |
| 2006/0259457 | A1* | 11/2006 | Muras | G06F 17/30433 |
| | | | | 707/E17.001 |
| 2008/0172356 | A1* | 7/2008 | Bruno | G06F 17/30442 |
| | | | | 707/E17.017 |

(Continued)

OTHER PUBLICATIONS

Pedro Bizarro, Nicolas Bruno, and David J. DeWitt—"Progressive Parametric Query Optimization"—IEEE Transactions on Knowledge and Data Engineering, vol. 21, No. 4, April 2009—pp: 1-13.*

(Continued)

*Primary Examiner* — Anh Ly
(74) *Attorney, Agent, or Firm* — Mintz Levin Cohn Ferris Glovsky and Popeo, P.C.

(57) ABSTRACT

In one aspect, there is provided a method. The method may include intercepting a request including one or more select queries sent to a database; generating a parametric form for each of one or more select queries; processing the parametric form to determine whether the one or more select queries cause an n-query issue comprising multiple selects, when executed at the database; and indicating an exception, when the one or more select queries cause the n-query issue. Related systems, methods, and articles of manufacture are also disclosed.

12 Claims, 5 Drawing Sheets

(56) References Cited

U.S. PATENT DOCUMENTS

| | | | |
|---|---|---|---|
| 2008/0243772 A1* | 10/2008 | Fuxman | G06F 17/2264 707/E17.012 |
| 2008/0288498 A1* | 11/2008 | Hinshaw | G06F 17/30575 707/E17.032 |
| 2010/0005074 A1* | 1/2010 | Endacott | G06N 5/025 707/E17.005 |
| 2010/0223256 A1* | 9/2010 | Chalana | G06F 17/30457 707/718 |
| 2011/0208690 A1* | 8/2011 | Cushing | G06F 17/30592 707/602 |
| 2011/0314000 A1* | 12/2011 | Chaudhuri | G06F 17/30463 707/718 |
| 2012/0005196 A1* | 1/2012 | Horii | G06F 17/30448 707/722 |
| 2013/0097139 A1* | 4/2013 | Thoresen | G06F 17/30991 707/706 |
| 2013/0159285 A1* | 6/2013 | Dees | G06F 17/30466 707/718 |
| 2013/0318068 A1* | 11/2013 | Apte | G06F 17/30492 707/718 |
| 2014/0149400 A1* | 5/2014 | Fu | G06F 17/30575 707/723 |
| 2014/0280026 A1* | 9/2014 | Anderson | G06F 17/30604 707/714 |
| 2014/0280159 A1* | 9/2014 | Cao | G06F 17/30498 707/737 |
| 2015/0205834 A1* | 7/2015 | Keeton | G06F 17/301 707/714 |
| 2015/0261507 A1* | 9/2015 | Bhagavan | G06F 8/33 717/113 |
| 2015/0363469 A1* | 12/2015 | Peloski | G06F 17/30516 707/741 |
| 2016/0034307 A1* | 2/2016 | Wilkinson | G06F 9/5038 718/104 |

OTHER PUBLICATIONS

Nickolay Tchervenski—"An Evaluation of Storage Load Balancing Alternatives for Database Systems"—MMath Essay—David R. Cheriton School of Computer Science—University of Waterloo—Feb. 2008—pp: 1-21.*

* cited by examiner

DETECTION OF THE N-QUERIES VIA UNIT TEST

TECHNICAL FIELD

The subject matter described herein relates generally to data processing.

BACKGROUND

Software testing may be performed to determine whether code operates properly. For example, unit testing may be performed to test whether one or more code modules work together given data and other operational conditions. Test script may be written to test one or more specific aspects of the modules and their behavior. To perform unit test, the test script may be run to test and monitor the behavior of the modules before the modules are further integrated with other modules and/or released as operational.

SUMMARY

In one aspect, there is provided a method. The method may include intercepting a request including one or more select queries sent to a database; generating a parametric form for each of one or more select queries; processing the parametric form to determine whether the one or more select queries cause an n-query issue comprising multiple selects, when executed at the database; and indicating an exception, when the one or more select queries cause the n-query issue.

In some variations, one or more of the features disclosed herein including the following features can optionally be included in any feasible combination. The n-query issue may further include multiple, consecutive selects when executed at the database. The n-query issue may further include a plurality of selects when executed at the database. The parametric form may include one or more portions of an original select query replaced by a predefined value. The process may further include detecting the n-query issue, when at least two select queries have at least a similar form. A unit test report may be generated indicating the request as including n-query issue.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

When for example a user at a user interface selects a user interface element, that selection may cause a request for all of the user's customers. This request may thus query all of the customers associated with a certain sales identifier (ID). Rather than causing one query, the server may cause repeated queries to a database to retrieve N customers, such as customer 13, customer 14, customer 37, and so forth under the sales ID of the user. The subject matter disclosed herein may, in some example implementations, provide an automated way of detecting too many queries to the database.

To illustrate further by way of an example, for each user interaction in a collaborative session, a backend server may need to run a few database queries in order to complete the action (for example, usually an HTTP request from the browser). Reducing the number of unnecessary queries on the database may, in some example implementations, decrease the burden of the unnecessary queries and thus increase overall system throughput. A source of these unnecessary queries is referred to as the "N-Query problem," wherein an application queries the database more than one time for N objects, when it could do it in a single query under the appropriate conditions. Although some of the examples disclosed herein refer to the N-query problem, the subject matter disclosed herein may be used in other situations in which there are too many queries to be sent to a server and/or database.

Figure 1:
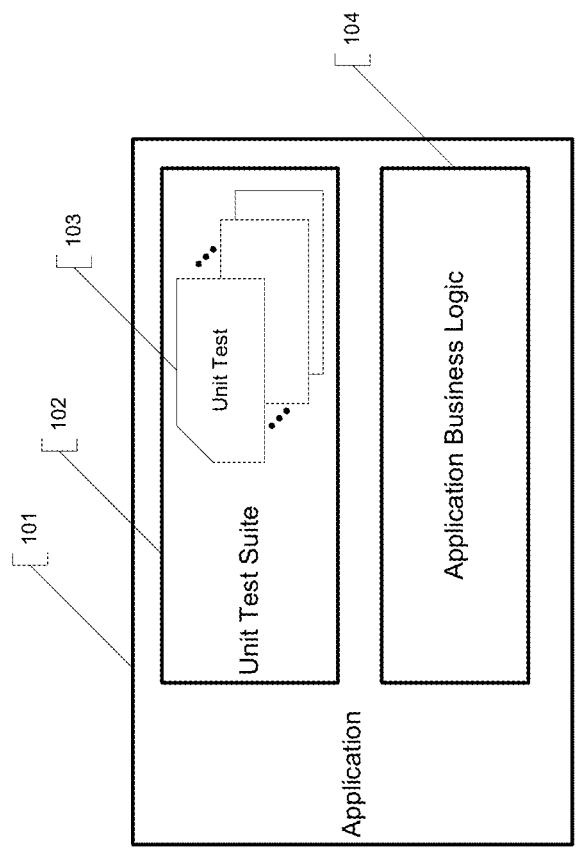
FIG. 1 depicts an example system including for n-query detection unit, in accordance with some example implementations.

FIG. 1 depicts an example of an application 101 and its corresponding logic 104 (for example, program code, script, business logic, and/or the like). The logic 104 may be tested for correctness and, more particularly, too many queries caused by, among other things, the N-query problem.

Figure 2:
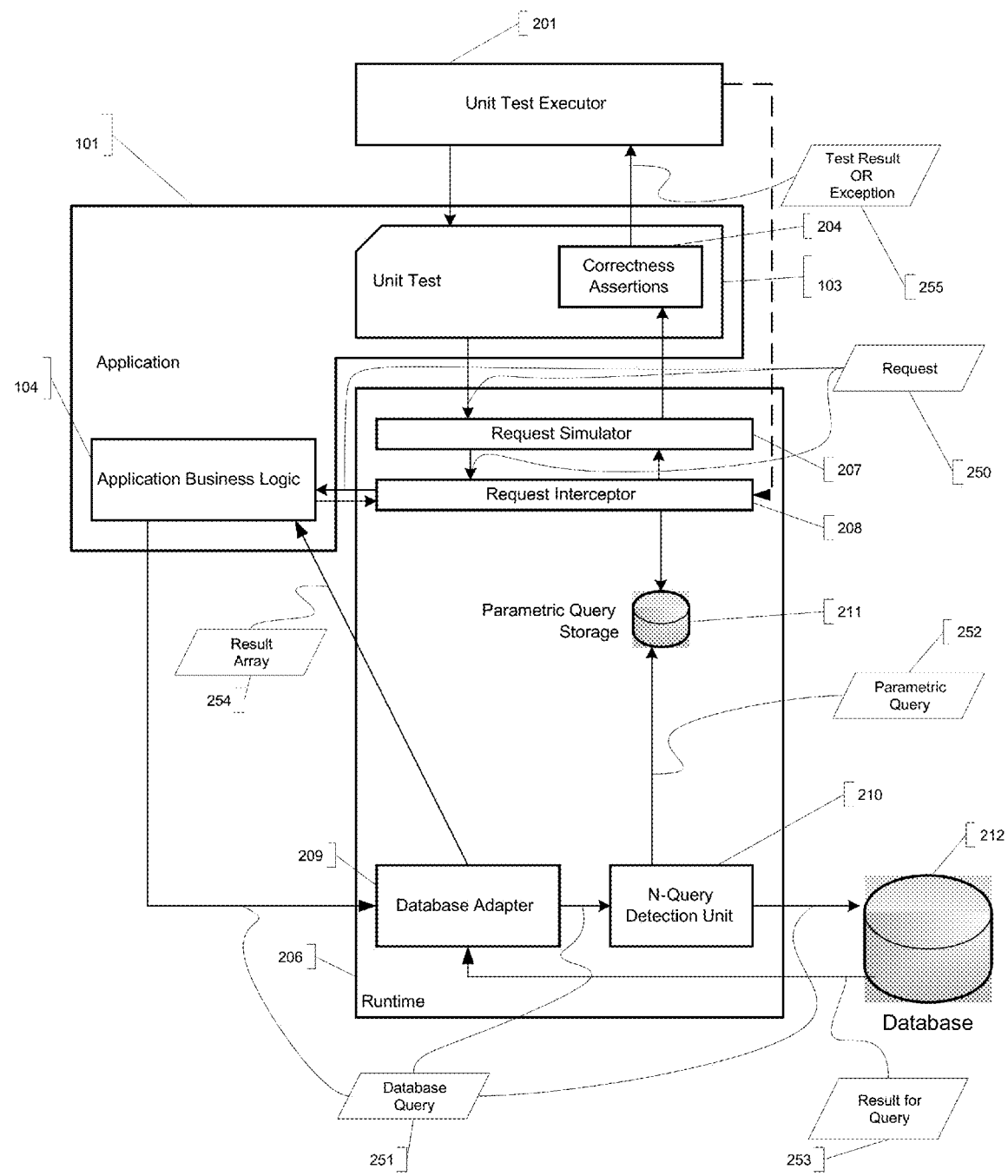
FIG. 2 shows an example of an interaction diagram for n-query detection, in accordance with some example implementations.

FIG. 1 also depicts a unit test suite 102 including one or more unit tests, such as unit test 103 and the like. FIG. 2 depicts an example interaction diagram including application 101 and unit test 103. The description of FIG. 2 also refers to FIGS. 1 and 3, which depicts an example process flow for the interaction diagram of FIG. 2.

To validate application 101 for correctness and, in particular too many queries, one or more unit tests of unit test suite 102 may be performed. In the example of FIG. 2, unit test 103 is run. To run a single unit test 103, a unit test executor 201 may handle the execution of unit test 103. Unit test executor 201 instructs and/or initiates the unit test 102 to run/execute, as shown at 310 at FIG. 3.

During execution, unit test 103 may invoke a request simulator 207 in runtime 206 to simulate a request 250 to the application 101 under test as depicted at 312 and 314.

The request simulator 207 may then attempt to run the application business logic, but the request 250 is intercepted, at 316, by the request interceptor 208. The request interceptor 208 may record, at 316, the start of processing for the request 250.

At 318, request interceptor 208 passes the request 250 to application business logic 104. The application business logic 205 handling request 250 may issue one or more database queries 251 to the database adapter 209 in runtime 206. For example, if all of the steps of the application business logic have not been run, a step of the application business logic 205 may be run which causes at 324 one or more database queries 251 to be sent to the database adapter 209 and database 212 (No at 320-324).

For each database query 251 received by the database adapter 209, the database adapter may adapt the query 251 for a specific query language dialect recognized by database 212 before sending the query to database 212.

At 326, N-Query detection unit 210 intercepts query 251 and find its general (for example, parametric) form 252. For example, N-Query detection unit 210 may intercept, at 326, the following query:

SELECT*FROM Employees WHERE FirstName='John' AND

LastName='Doe' AND IsActive=TRUE AND EmployeeNumber=

3124 AND Manager IS NOT NULL AND Department IN ('Accounting', 'Payroll')

At 326, N-Query detection unit 210 obtains the parametric form of the query as follows:

SELECT*FROM Employees WHERE FirstName=? AND

LastName=? AND IsActive=? AND EmployeeNumber=? AND

Manager IS NOT ? AND Department IN (?)

To illustrate further, N-Query detection unit may intercept at 326 another query having the following form:

SELECT*FROM Employees WHERE FirstName='Eva' AND

LastName='Ford' AND IsActive=FALSE AND EmployeeNumber

=74 AND Manager IS NOT NULL AND Department IN ('Engineering', 'Legal', 'Marketing')

For the second query, the N-Query detection unit determines the parametric form as follows:

SELECT*FROM Employees WHERE FirstName=? AND

LastName=? AND IsActive=? AND EmployeeNumber=? AND

Manager IS NOT ? AND Department IN (?)

Although the two queries in the previous examples were different, the two queries have the same parametric form. The parametric form may thus provide useful information for the purpose of understanding the N-Query problem.

At 328, N-Query detection unit 210 records the parametric form of the intercepted query 252 (also referred to as parametric query) at parametric query storage 211. At 330, the N-Query detection unit 210 sends the query 251 to the database 212 for execution. At 332, database 212 returns a query result 253 to the database adapter 209.

At 334-336, database adapter 209 transforms the database result 253 into a structure, such as an array 254, and sends the array back to the application business logic 205. This process may repeat for one or more (if not all) of the steps of the application business logic. But once all the application business logic 104 steps have been executed, logic 104 returns to the request interceptor 208 in runtime 206 (Yes at 320 and 338).

At 340, request interceptor 208 accesses the parametric queries stored in parametric query storage 211 to determine if the number of times any particular parametric query has been recorded exceeds a threshold quantity (for example, an integer constant larger than 1). If so, then request interceptor 208 throws an exception indicating that an N-Query problem is found (Yes at 340 and 342).

At 344, the request interceptor 208 returns to the request simulator 207 which then returns to the unit test 203.

At 346-348, if exceptions were thrown in the course of running the simulated request, such as from the request interceptor 208, the unit test 203 sends the exception 255 onto the unit test executor 201 to report as a test failure.

At 350-352, if no exceptions were thrown, then the unit test checks its correctness assertions 204. If assertions fail, then the failures 255 are sent to the unit test executor 201 to report.

At 354, if no failures or exceptions are sent to the unit test executor 201, then the unit test 203 is considered as successful by the unit test executor.

Figure 3:
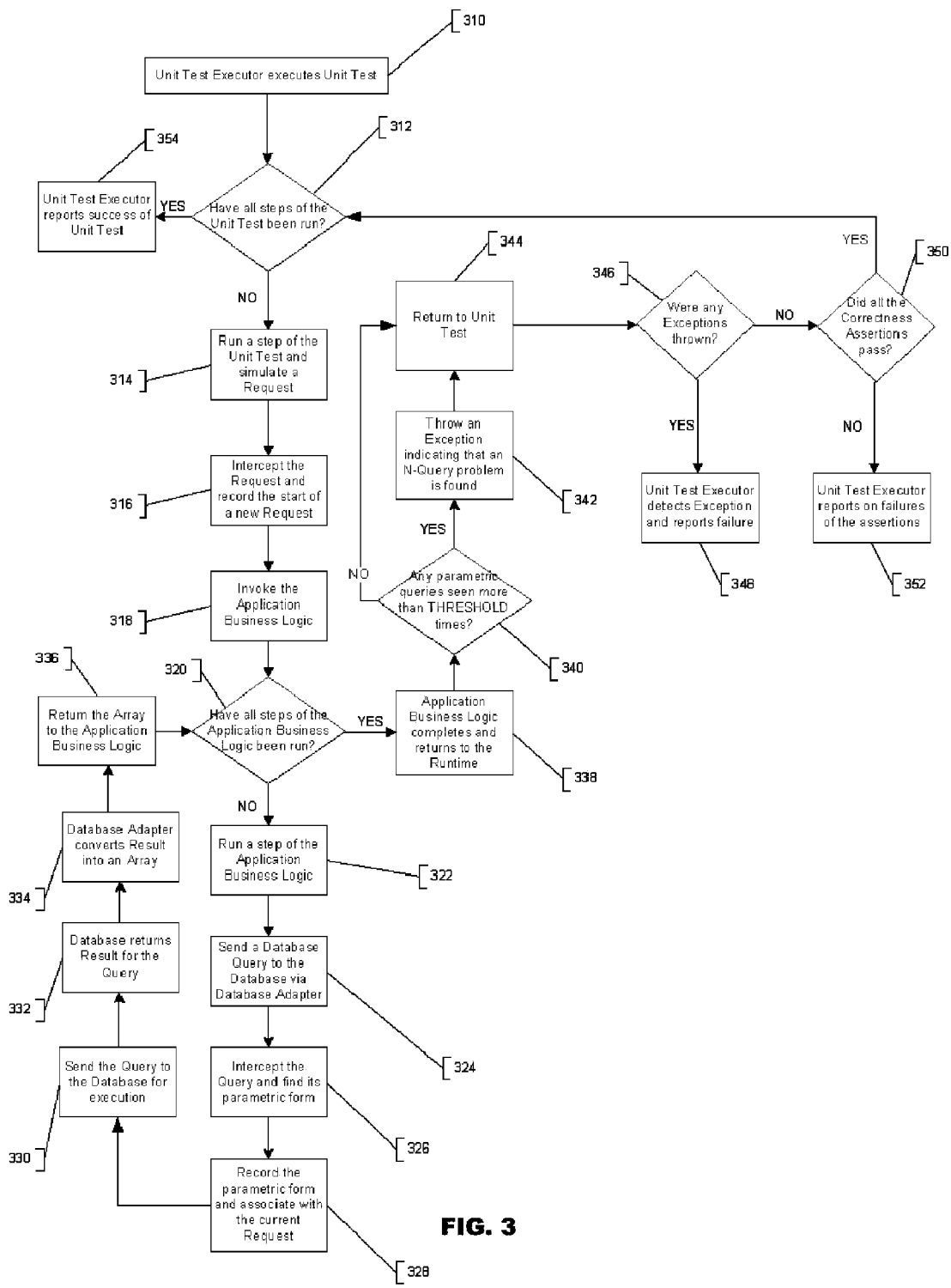
FIG. 3 shows an example of a process for n-query detection, in accordance with some example implementations.
Figure 4:
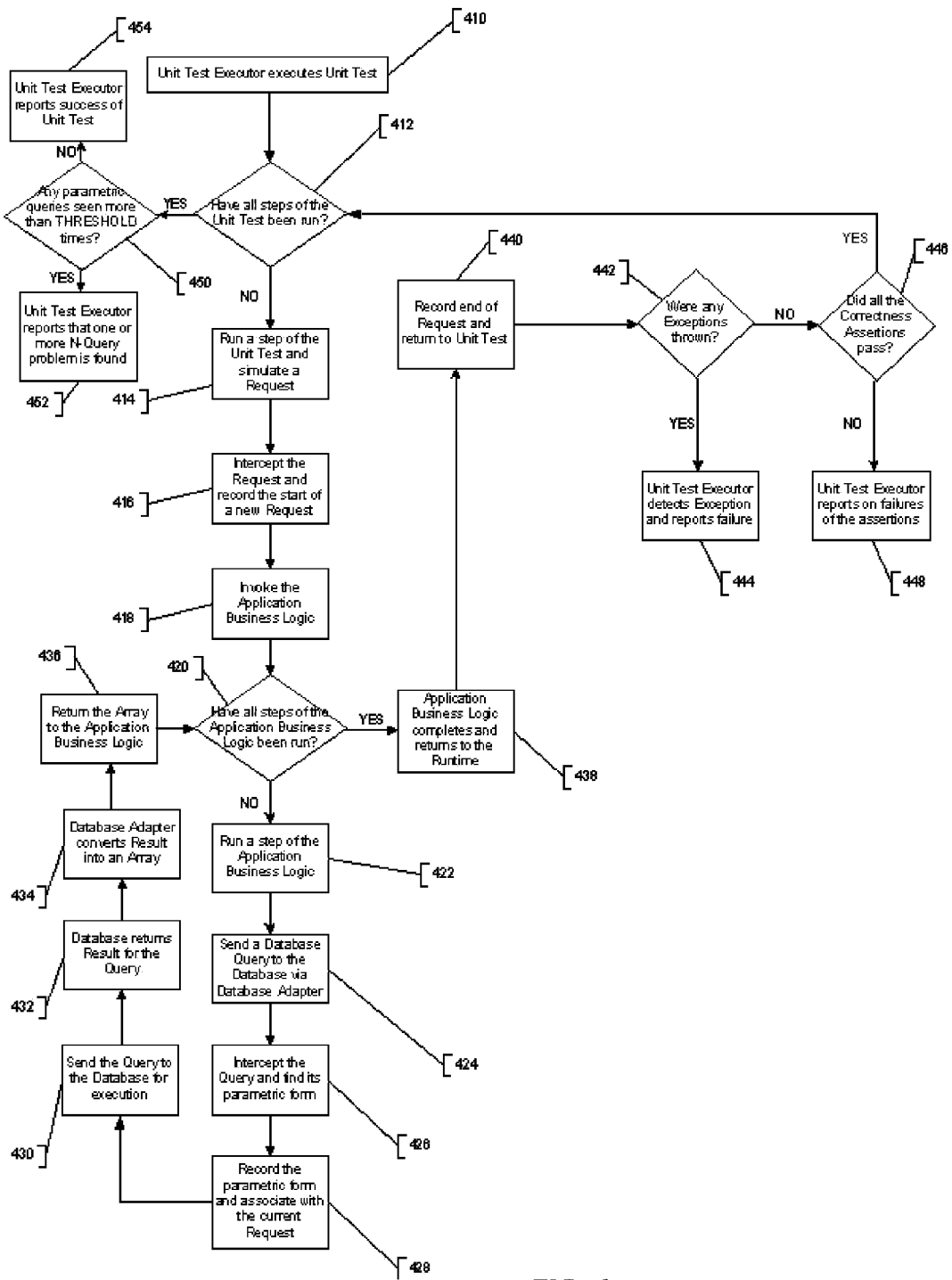
FIG. 4 shows another example of a process for n-query detection, in accordance with some example implementations.

FIG. 4 depicts another example process flow, in accordance with some example embodiments. The description of FIG. 4 also refers to FIGS. 2 and 3.

The process at FIG. 4 is similar to FIG. 3 in some respects but after 438 (which corresponds to 338 at FIG. 3); the request interceptor 208 may record the end of the request processing and return directly to the request simulator 207 via 440. In FIG. 4, the check for N-Query problems is instead performed after some (if not all) of the steps of the unit test have been run, after the yes branch of 412 (which corresponds to 312 at FIG. 3). In this case, unit test executor 201 accesses the request interceptor 208, which in turn accesses the parametric query storage 211 to determine, at 450, if there were one or more requests where, during the processing of that request, there were parametric queries recorded which had more than a threshold number of occurrences (in other words, the request has an N-query problem). At 452, if at least one request was found to have the N-Query problem, then the unit test executor 201 reports this finding as a test failure at 452. The process at FIG. 4 may allow the unit test executor 201 to report on multiple requests that all have the N-Query problem, rather than terminating the unit test execution after the first N-Query problem is found as in the case of the process at FIG. 3. As such, the process of FIG. 4 may allow identifying more N-Query problem to be found using the same unit test 203, when compared to the process at FIG. 3.

Figure 5:
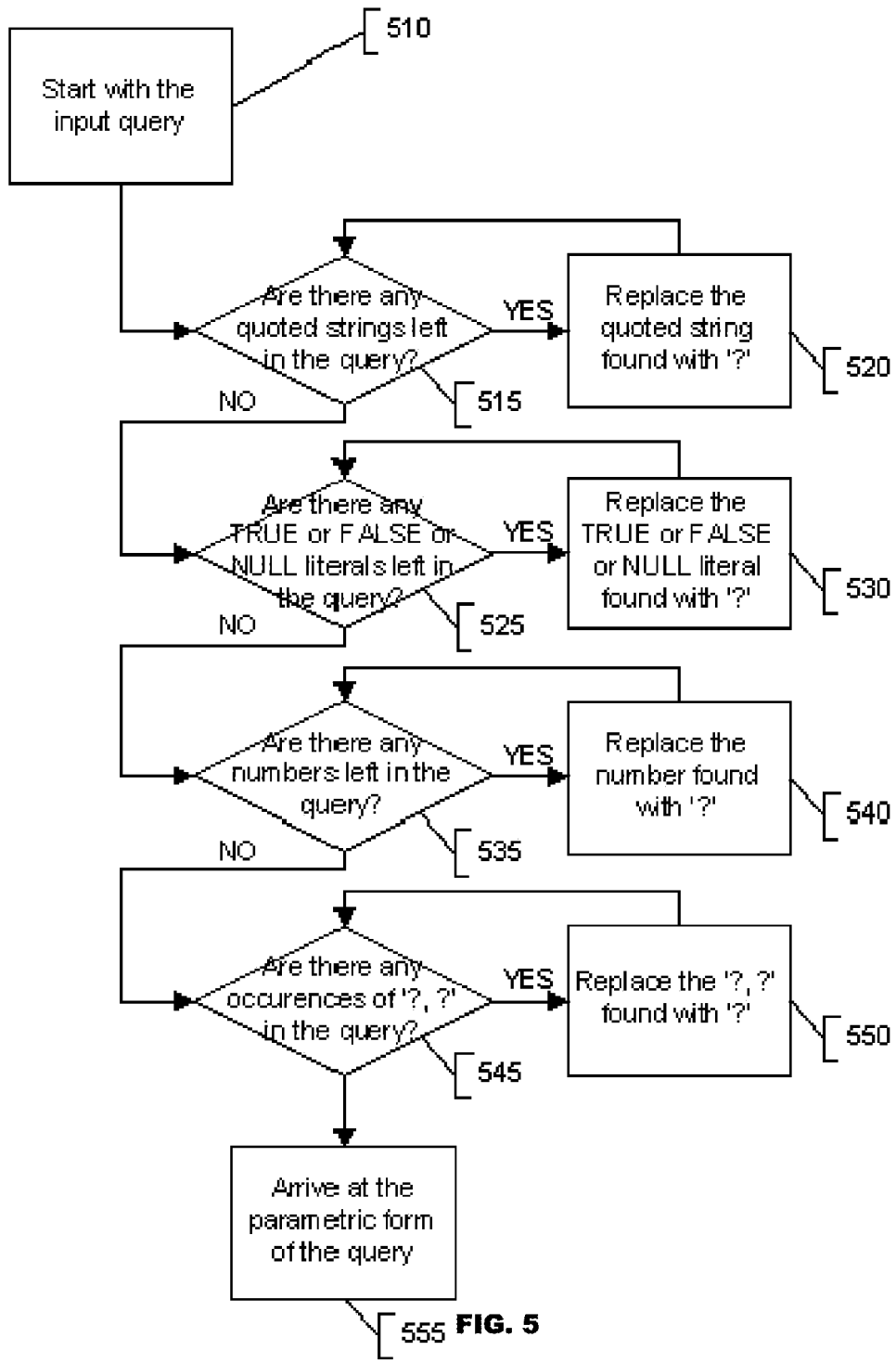
FIG. 5 shows an example of a process for parameterizing a query, in accordance with some example implementations.

FIG. 5 depicts an example process 500 for determining a parametric form of a query as noted above at 326 and 426.

At 510, N-query detector 208 may obtain (or receive) an intercepted query 251. For example, the intercepted query 251, may have the following form:

SELECT*FROM Employees WHERE FirstName='John' AND
LastName='Doe' AND IsActive=TRUE AND EmployeeNumber=
3124 AND Manager IS NOT NULL AND Department IN ('Accounting', 'Payroll')

At 515-520, N-query detector 208 may, for each quoted string (for example, between single quotes, such as "'John'" and "'Doe'") in the query, N-query detector 208 replaces the contents of the string with a single character, such as "?" (the question mark character). Returning to the previous example, the select thus becomes:

SELECT*FROM Employees WHERE FirstName=? AND
LastName=? AND IsActive=TRUE AND EmployeeNumber=
3124 AND Manager IS NOT NULL AND Department IN (?, ?)

At 525-530, for each literal TRUE, FALSE or NULL in the query, N-query detector 208 replaces the literal with a single character, such as "?". Returning again to the previous example, the select now becomes:

SELECT*FROM Employees WHERE FirstName=? AND
LastName=? AND IsActive=? AND EmployeeNumber=3124
AND Manager IS NOT ? AND Department IN (?, ?)

At 535-540, for each number in the query, N-query detector 208 replaces the number with a single character, such as "?". Returning again to the previous example, the select is transformed to the following:

SELECT*FROM Employees WHERE FirstName=? AND
LastName=? AND IsActive=? AND EmployeeNumber=? AND
Manager IS NOT ? AND Department IN (?, ?)

At 545-550, for each occurrence of the sequence of characters "?, ?", the characters are replaced with a single character, such as "?". Returning again to the previous example, the select is transformed to:

SELECT*FROM Employees WHERE FirstName=? AND
LastName=? AND IsActive=? AND EmployeeNumber=? AND
Manager IS NOT ? AND Department IN (?)

At 555, the resulting query is handled as the parametric form of the originally intercepted query received at 510. And, the following parametric query may be stored to storage 212:

SELECT*FROM Employees WHERE FirstName=? AND
LastName=? AND IsActive=? AND EmployeeNumber=? AND
Manager IS NOT ? AND Department IN (?)

Without in any way limiting the scope, interpretation, or application of the claims appearing below, a technical effect of one or more of the example embodiments disclosed herein is increase operating efficiency and/or speed of database execution.

As used herein, the term database may refer to a database management system and its associated structured data.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A non-transitory computer-readable medium including code that, when executed by at least one programmable processor, causes the at least one programmable processor to perform operations comprising:
   intercepting a plurality of requests from an application, the plurality of requests including a select query sent to a database;
   generating a parametric form for the plurality of requests, to form a plurality of parametric queries;
   storing the plurality of parametric queries;
   processing the plurality of parametric queries to detect an n-query issue, the n-query issue being detected in response to at least two select parametric queries matching, the at least two select parameteric queries having the same form comprising the select query and a predefined value; and
   indicating an exception, in response to the n-query issue being detected.

2. The computer-readable medium of claim 1, wherein the plurality of requests are sent to the database for execution.

3. The computer-readable medium of claim 1, wherein the parametric form includes one or more portions of an original select query replaced by a predefined value.

4. The computer-readable medium of claim 1 further comprising:
   generating a unit test report indicating the request as including the n-query issue.

5. A system comprising:
   at least one processor; and
   at least one memory including program code which when executed by the at least one processor causes operations comprising:
   intercepting a plurality of requests from an application, the plurality of requests including a select query sent to a database;
   generating a parametric form for the plurality of requests, to form a plurality of parametric queries;
   storing the plurality of parametric queries;
   processing the plurality of parametric queries to detect an n-query issue, the n-query issue being detected in response to at least two select parametric queries matching, the at least two select parameteric queries having the same form comprising the select query and a predefined value; and
   indicating an exception, in response to the n-query issue being detected.

6. The system of claim 5, wherein the plurality of requests are sent to the database for execution.

7. The system of claim 5, wherein the parametric form includes one or more portions of an original select query replaced by a predefined value.

8. The system of claim 5, wherein the operations further comprise:
   generating a unit test report indicating the request as including the n-query issue.

9. A method comprising:
   intercepting a plurality of requests from an application, the plurality of requests including a select query sent to a database;
   generating a parametric form for the plurality of requests, to form a plurality of parametric queries;
   storing the plurality of parametric queries;
   processing the plurality of parametric queries to detect an n-query issue, the n-query issue being detected in response to at least two select parametric queries matching, the at least two select parameteric queries having the same form comprising the select query and a predefined value; and
   indicating an exception, in response to the n-query issue being detected.

10. The method of claim 9, wherein the plurality of requests are sent to the database for execution.

11. The method of claim 9, wherein the parametric form includes one or more portions of an original select query replaced by a predefined value.

12. The method of claim 9 further comprising:
   generating a unit test report indicating the request as including the n-query issue.

* * * * *